United States Patent
Ward et al.

(10) Patent No.: US 8,743,513 B2
(45) Date of Patent: Jun. 3, 2014

(54) ARC FAULT DETECTOR FOR AC OR DC INSTALLATIONS

(75) Inventors: Patrick Ward, Ballinasloe (IE); Brian Daniels, Newbridge (IE)

(73) Assignee: Shakira Limited, Ballinasloe (IE)

( * ) Notice: Subject to any disclaimer, the term of this patent is extended or adjusted under 35 U.S.C. 154(b) by 0 days.

(21) Appl. No.: 13/642,996

(22) PCT Filed: May 27, 2011

(86) PCT No.: PCT/EP2011/058754
§ 371 (c)(1),
(2), (4) Date: Oct. 23, 2012

(87) PCT Pub. No.: WO2011/151267
PCT Pub. Date: Dec. 8, 2011

(65) Prior Publication Data
US 2013/0038971 A1    Feb. 14, 2013

(30) Foreign Application Priority Data

Jun. 3, 2010   (IE) .................................. S2010/0361
Sep. 2, 2010   (IE) .................................. S2010/0534

(51) Int. Cl.
*H02H 3/26*     (2006.01)

(52) U.S. Cl.
USPC ........................................................ 361/42

(58) Field of Classification Search
USPC ........................................................ 361/42
See application file for complete search history.

(56) References Cited

U.S. PATENT DOCUMENTS

| | | | | |
|---|---|---|---|---|
| 4,616,176 A | * | 10/1986 | Mercure et al. | 324/127 |
| 4,887,272 A | * | 12/1989 | Karube et al. | 372/38.01 |
| 4,933,630 A | * | 6/1990 | Dupraz | 324/107 |
| 5,856,902 A | * | 1/1999 | Hashimoto et al. | 361/42 |
| 6,366,076 B1 | * | 4/2002 | Karrer et al. | 324/117 R |
| 6,373,257 B1 | | 4/2002 | Macbeth et al. | |
| 6,414,829 B1 | * | 7/2002 | Haun et al. | 361/42 |
| 6,614,218 B1 | * | 9/2003 | Ray | 324/117 R |
| 6,670,799 B1 | * | 12/2003 | Bull et al. | 324/76.11 |
| 7,598,724 B2 | * | 10/2009 | Howell et al. | 324/127 |
| 2004/0263183 A1 | | 12/2004 | Naidu et al. | |
| 2006/0220774 A1 | * | 10/2006 | Skendzic | 336/200 |
| 2006/0262466 A1 | * | 11/2006 | Engel | 361/42 |
| 2007/0247767 A1 | * | 10/2007 | Zhang | 361/42 |
| 2009/0147412 A1 | * | 6/2009 | Kojovic et al. | 361/36 |
| 2009/0187285 A1 | * | 7/2009 | Yaney et al. | 700/292 |
| 2010/0013460 A1 | * | 1/2010 | Ermisch et al. | 324/127 |
| 2010/0045417 A1 | * | 2/2010 | Feng et al. | 336/173 |
| 2010/0309591 A1 | * | 12/2010 | Shea et al. | 361/42 |
| 2011/0043190 A1 | * | 2/2011 | Farr | 324/126 |
| 2011/0050154 A1 | * | 3/2011 | Farr | 318/778 |
| 2013/0038971 A1 | * | 2/2013 | Ward et al. | 361/86 |

FOREIGN PATENT DOCUMENTS

WO   2004/059811 A1   7/2004

OTHER PUBLICATIONS

International Search Report and Written Opinion for PCT/EP2011/058754, mailed Feb. 7, 2012.

* cited by examiner

*Primary Examiner* — Ronald W Leja
(74) *Attorney, Agent, or Firm* — Withrow & Terranova, P.L.L.C.

(57) ABSTRACT

An arc fault detector comprises a current transformer (CT) having a primary winding and a secondary winding (W1), the primary winding being formed by at least one conductor (L) of an AC or DC supply circuit. The inductance of the CT is selected so that the CT has a lower frequency operating point (LFOP) of at least 10 KHz. The detector also comprises circuitry (10, 12, SW) for disconnecting the supply if the voltage induced in the secondary winding meets predetermined criteria as to magnitude and duration.

10 Claims, 15 Drawing Sheets

Fig. 12

Fo ~ 10KHz with soft iron core CT

ETR plotted against resonant frequency for three CT cores.

CT output

Comp 1 output

Pulse stretcher output.

Comp 2 output.

Comp 3 output.

ARC FAULT DETECTOR FOR AC OR DC INSTALLATIONS

This application is a 35 USC 371 National Phase filing of International application PCT/EP2011/058754, filed May 27, 2011, which claims priority to Irish national applications S2010/0361 filed Jun. 3, 2010 and S2010/0534 filed Sept. 2, 2010, the disclosures of which are incorporated herein by reference in their entireties.

This invention relates to an arc fault detector for AC or DC installations.

Arcing is a normal consequence of switching loads on or off. Such normal arcing occurs within the switch and is usually of relatively short duration. As a result it rarely results in a hazardous condition. On the other hand, arc fault conditions can arise anywhere along a circuit or installation which can give rise to high and sustained levels of arcing which can result in electrical fires, and it is desirable to detect and eliminate such arcing faults quickly and effectively.

There is a requirement in UL1699 for detection of both series and parallel arc fault currents. The conditions under which each of these types of arc faults can occur are represented in FIG. 1, where (a) shows a series arc fault and (b) shows a parallel arc fault.

In the case of series arcing, FIG. 1(a), a break occurs along the length of a conductor resulting in arcing between the two broken ends of the conductor. However, a load LD must be connected so as to complete a circuit and enable the arcing current to flow.

In the case of parallel arcing, FIG. 1(b), a breakdown in insulation occurs between two conductors, causing arcing across the conductors. One of the conductors may be the earth conductor. In this case, regardless of whether or not a load LD is connected, an additional arcing current will flow in the circuit during the arc fault condition because of the additional current path created by the arc fault.

Prior to an arcing condition, the current flow in a circuit is usually symmetrical and predictable. However, during arc fault conditions the current flow is no longer symmetrical and in fact is interrupted and re-established at very fast rates and becomes highly unpredictable and chaotic. Arcing may occur anywhere over each mains cycle, but often tends to be concentrated at or near the zero crossover points of the cycle in an AC supply system.

Both series and parallel arcing will generate combustion and heat which could give rise to electrical fires. Arcing also causes a considerable amount of electrical noise to be generated. This noise can be spread across a wide frequency spectrum, e.g. a few KHz to hundreds of MHz. Arc fault detectors (AFDs), also known as arc fault circuit interrupters (AFC's), are intended to provide protection against such faults.

The paper "*Arc Detection With the AFCI*" by George Gregory and Alan Manche, IAEI News, July/August 2000, page 85, provides a generic overview of arc fault circuit interrupters, but few operational details are given. The circuits shown appear to make use of current transformer cores surrounding one or more supply conductors, but the operation of the circuits is not described.

The paper "*A Method for Residential Series Arc Fault Detection and Identification*" by Dongwei Li, Zhengxiang Song, Jianhua Wang, Yingsan Geng, Huilin Chen, Li Yu, Bo Liu, *State Key Laboratory of Electrical Insulation & Power Equipment School of Electrical Engineering*, Xi'an Jiaotong University Xi'an, P.R.China, describes the complexity of series arcing fault signals and the difficulty of reliably detecting such arc faults. It goes on to describe a method of detection based on combining Fourier transform methods with wavelet transform methods in which wavelets are discretely sampled.

U.S. Pat. No. 5,706,154 (GEC) detects arcing by passing the load conductor through an interrupted transformer core. An arcing fault causes arcing across the gap in the core. This heats a bi-metal strip which causes the contacts to open.

U.S. Pat. Nos. 7,253,637, 6,259,996 and 7,151,656 (all Square D) use ferrite, iron or molded permeable cores which are designed to operate at frequencies less than about 10 kHz.

As indicated by the above, the prior art employs a wide range of solutions to detect faulty arcing. Arcing is often referred to as having a signal which can be detected, or a signature which can be recognised and detected. In many cases, in addition to detection of an arcing signal or signature there is a requirement for processing of the detected signals which can involve filters, timers, data extraction, algorithms, microprocessors, etc. In most cases the processing element is the most sophisticated and complex part of the entire system, adding considerably to cost and reliability problems.

It is evident, therefore, that the detection of arc fault conditions and distinguishing these from normal arcing can be quite difficult, and hence the plethora of methods used for detection of arc faults. However, despite many solutions applied to date, there is still a considerable level of dissatisfaction with the performance of many existing arc fault detection devices because of their poor performance, their cost and complexity, or their propensity to trip under non fault or normal arcing conditions. For example, many electrical appliances such as drills generate arcing during normal operation and it can be very difficult to distinguish between such normal arcing and faulty arcing. These and other types of appliances, e.g. dimmer switches, can generate spurious noise which is superimposed on the mains supply and can cause conventional arc fault detectors to trip under non fault conditions.

In addition, none of the above prior art refers to arc fault current detection in DC systems and there appears to be little relevant prior art in this area. Detection of arc fault currents in DC systems is becoming ever more important because of the increasing use of PV (photovoltaic) systems for energy generation. In addition, DC installations as used in mines, tunnels, ships and aircraft can all be prone to arc fault currents which could pose a serious fire hazard.

According to the present invention there is provided an arc fault detector comprising a current transformer (CT) having a primary winding and a secondary winding, the primary winding being formed by at least one conductor of an AC or DC supply circuit, the inductance of the CT being selected so that the CT has a lower frequency operating point (LFOP) of at least 10 KHz, the detector also comprising circuitry for disconnecting the supply if the voltage induced in the secondary winding meets predetermined criteria as to magnitude and duration.

For the purpose of the present invention the lower frequency operating point (LFOP) of a CT is defined as the frequency below which the energy transfer between the primary and secondary of the CT drops by at least 3 db from its peak level, and is determined by the formula LFOP=$1/2\pi L$, where L is the inductance of the CT.

The term "winding" is used in relation to the primary in accordance with conventional terminology, even though the primary may constitute a single conductor passing through the CT.

The invention applies both to arrangements in which the vector sum of currents flowing in the primary conductor(s) at normal operating frequency is zero under normal supply conditions and also to arrangements in which the vector sum of currents flowing in the primary conductor(s) at normal operating frequency is greater than zero under normal supply conditions.

Preferably the current transformer has an air core or a ferrite core, and an LFOP within the range 150 KHz to 350 KHz.

In one embodiment the supply circuit is a single phase AC supply comprising live and neutral conductors and the CT has a core which surrounds the live conductor only.

In another embodiment the supply circuit is a two phase AC supply and the CT has a core which surrounds both phase conductors whose currents pass in the same direction through the core such that the vector sum of the currents passing through the core is greater than zero during normal operating conditions.

In a further embodiment the supply circuit is a multi phase AC supply and a respective CT core surrounds each of the supply conductors.

In a further embodiment the supply circuit is a single phase AC supply comprising live and neutral conductors and the CT has a core which surrounds both conductors such that the vector sum of the currents passing through the core is greater than zero during normal operating conditions.

In a further embodiment the supply circuit is a multi phase AC supply and the CT has a core which surrounds all of the supply conductors such that the vector sum of the currents passing through the core is zero during normal operating conditions.

In a further embodiment the supply circuit is a DC supply and the CT has a core which surrounds one of the supply conductors.

Preferably the detection circuitry comprises a first comparator for providing an output pulse each time the voltage induced in the secondary winding rises above a first threshold level, a pulse stretcher for stretching the output pulses of the first comparator, a second comparator for providing an output pulse each time the voltage of a stretched output pulse rises above a second threshold level, a voltage integrator for the output pulses of the second comparator, and a third comparator for providing an output pulse when the integrated voltage rises above a third threshold level.

The arc fault detector may further include a test circuit comprising a further CT primary winding and a test signal generator for generating in the further primary winding a voltage which will induce a voltage representative of an arc fault in the secondary winding.

A key characteristic of arcing under fault conditions is that the arc produces a substantial amount of energy each time the arc is established and current flow results. The arcing condition causes the arc current to make and break at a very rapid rate and at frequencies substantially higher than the normal mains supply frequency. The current produced under series arcing conditions can be as much as the full load current that would flow under non fault conditions, and can be of several amperes for parallel arc fault conditions. As a result, arcing produces a relatively large amount of energy at high frequencies during arcing occurrences. This is evidenced by U.S. Pat. No. 5,706,154 (GEC) which indicates how the energy from an arc fault current can be harnessed and transformed into heat to achieve tripping of an AFD.

The embodiments of the present invention "harness" the energy produced by the arc fault current as the primary means of detection, the characteristics of the arcing current in terms of its wave shape, form or signature, etc., not being of significance for the correct functioning of the embodiments. In the embodiments the harnessed energy is in the form of the RMS value of the current induced into a current transformer by an arc fault current which is used to trip an AFD.

There is also provided, as an independent invention, an arc fault detector including a current transformer (CT) having a primary winding comprising at least one conductor of an AC or DC supply and a secondary winding connected to circuitry for detecting a voltage induced in the secondary winding representative of an arc fault ("arc fault representative voltage") and for disconnecting the supply if an arc fault representative voltage is detected, the detector further including a test circuit comprising a further CT primary winding and a test signal generator for generating in the further winding a voltage which will induce an arc fault representative voltage in the secondary winding.

Embodiments of the present invention will now be described, by way of example, with reference to the accompanying drawings, in which.

Figure 19:
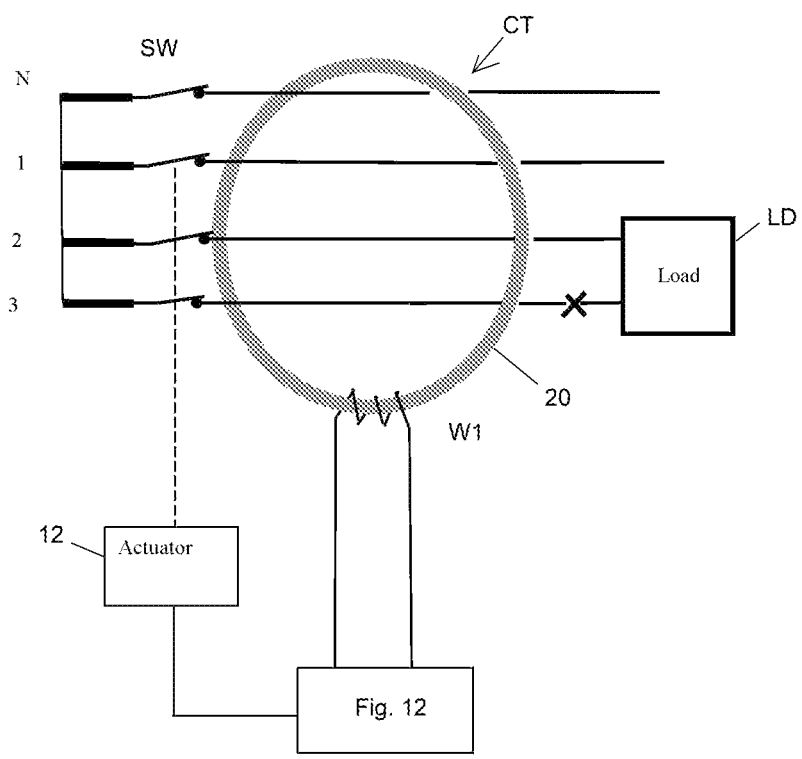
FIG. 19 shows an embodiment in which a single CT is used for detection of arc fault currents in a multiphase circuit.
Figure 20A:
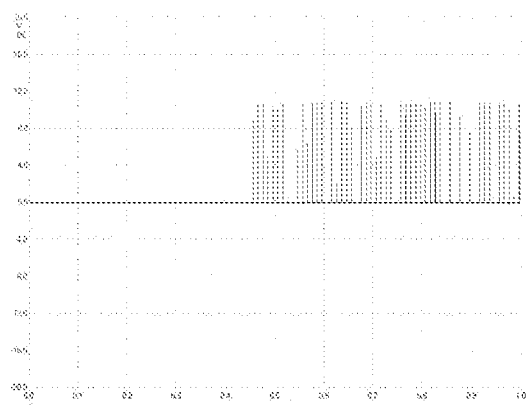
Figure 20B:
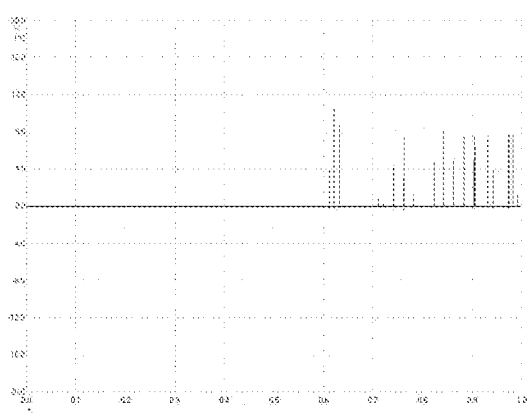
Figure 20C:
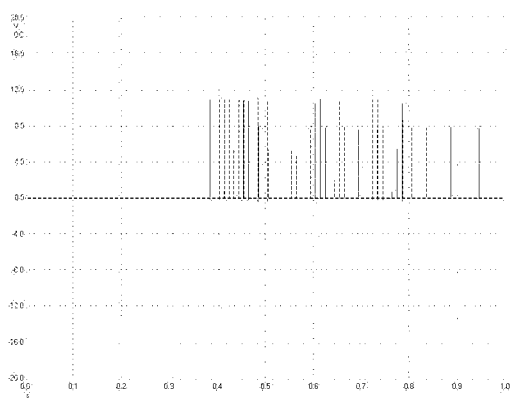

FIGS. 20a, 20b and 20c demonstrate how the FIG. 19 embodiment exploits the phenomenon of core imbalance.

Figure 21:
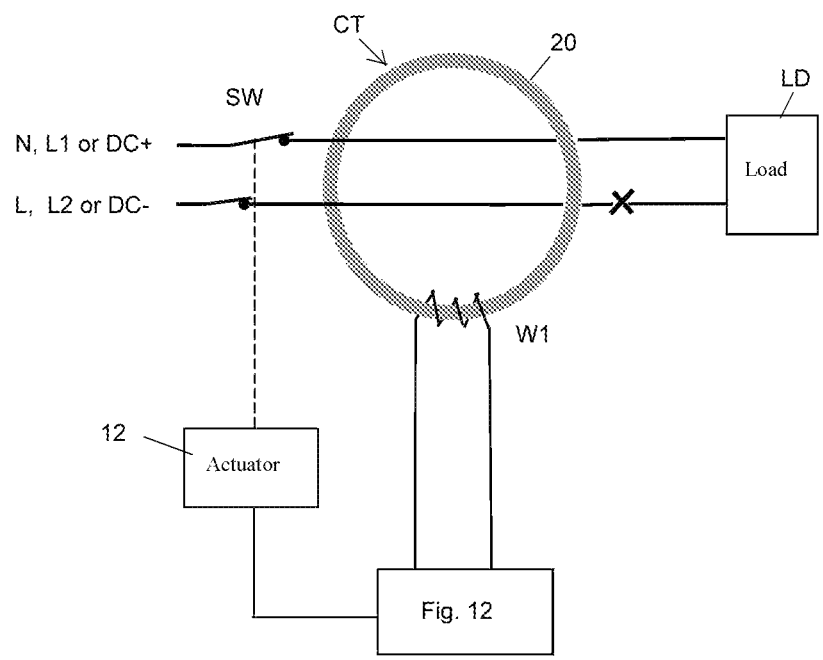

FIG. 21 is an embodiment for a single or two phase circuit based on a balanced CT arrangement.

In the various Figures of the drawings the same or equivalent components have been given the same references.

Figure 1:
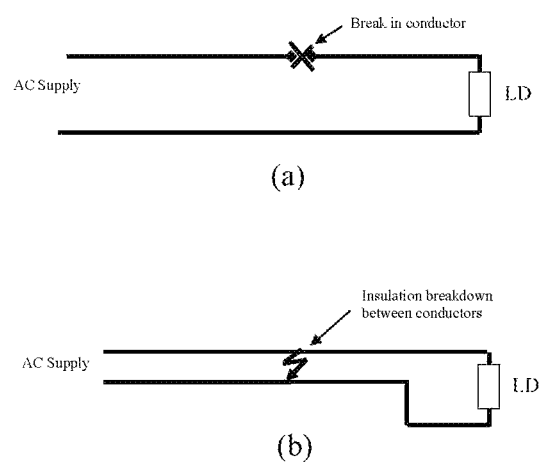
FIG. 1 is a schematic diagram showing the nature of series and parallel arcing.
Figure 2:
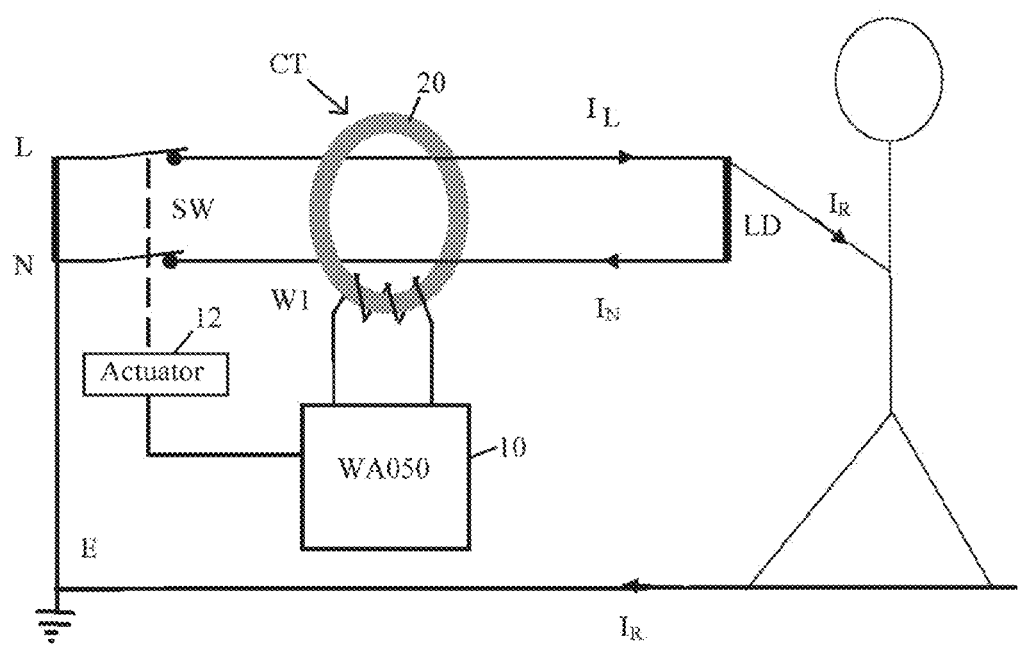
FIG. 2 is a schematic circuit diagram of a known type of residual current device (RCD).

FIG. 2 is an example of a known type of residual current device (RCD), also known as a ground fault circuit interrupter (GFCI). A single phase AC mains supply to a load LD comprises live L and neutral N conductors which pass through the core 20 of a current transformer CT. The currents $I_L$ and $I_N$ in the live and neutral conductors flow in opposite directions through the core. These conductors serve as a primary "winding" of the current transformer CT, and a winding W1 on the core serves as a secondary of the current transformer.

A key point to note is that in an RCD all conductors supplying the protected circuit (in this case the conductors L and N) are passed through the current transformer core 20 such that the vector sum of the currents $I_L$ and $I_N$ flowing in the conductors under normal conditions is zero in the absence of a residual (earth fault) current $I_R$. The presence of a residual current $I_R$ leads to a non-zero vector sum which induces a mains frequency current in the secondary winding W1. By selecting the lower frequency operating point (LFOP, as defined above) of the current transformer CT and its load to be at least approximately equal to the mains supply frequency there will be optimum transfer of energy from the primary circuit into the secondary circuit under earth fault conditions at that frequency. Conversely, the CT will be substantially less responsive to residual currents at frequencies substantially lower than its LFOP.

In a standard RCD the mains frequency current induced in the winding W1 is detected by a WA050 RCD integrated circuit (IC) 10. The WA050 IC 10 is an industry standard RCD IC supplied by Western Automation Research & Development Ltd, Ireland and described in U.S. Pat. No. 7,068,047. If the voltage developed across W1 is of sufficient magnitude and duration, the IC 10 will produce an output which will cause a mechanical actuator 12 to open ganged switch contacts SW in the live and neutral conductors to disconnect the mains supply. (See article "Demystifying RCDs" at www.westernautomation.com for detailed description of different RCD technologies)

With the exception of an arc fault current between a live conductor and earth, all arc fault currents can be considered to be balanced currents rather than differential currents. This makes the conventional residual current detector shown in FIG. 2 unsuitable for detection of series or parallel arc fault currents which do not flow to earth. This problem can be overcome by the arrangement of FIG. 3, in which possible parallel and series arc faults are indicated by X.

Figure 3:
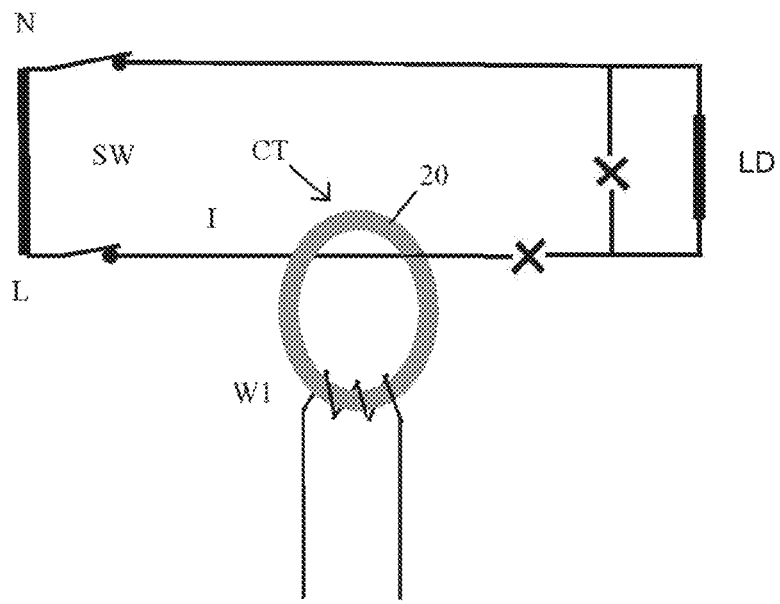
FIG. 3 is a schematic circuit diagram of a current transformer and is helpful in explaining the embodiments of the invention.

The arrangement of FIG. 3 comprises a 230V/50 Hz mains supply, live and neutral conductors L, N respectively, a load LD comprising (in this example) a domestic vacuum cleaner, and a current transformer CT with a core 20 comprising a permeable material such as soft iron. A resistive load could have been used, but a vacuum cleaner was chosen as the load because it tends to produce a relatively high level of electrical noise or interference signals on the mains supply and could therefore produce more onerous conditions for detection of a coincident arc fault current. As before there is a secondary winding W1, but the important difference is that only the live conductor L passes through the CT core 20 as the primary winding.

It is immediately obvious that this circuit does not operate on the principle of an RCD because the vector sum of currents flowing through the core will never be zero (unless the mains supply is switched off).

Figure 4:
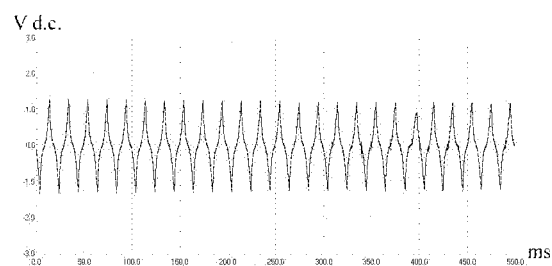
FIGS. 4 and 5 are waveforms helpful in explaining the embodiments of the invention.

If the CT in the arrangement of FIG. 3 has a LFOP close to that of the mains supply frequency, as was the case for the arrangement of FIG. 2, any load current flowing in the live conductor at the mains supply frequency would be likely to induce a significant output from the CT. FIG. 4 shows the voltage generated by the CT (i.e. across the winding W1) in response to the load current and a coincident series arc fault condition based on the arrangement of FIG. 3, with the LFOP of the CT set at or close to the mains supply frequency.

FIG. 4 comprises a waveform substantially at the mains frequency. The wave shape is not a pure sine wave due to partial saturation of the soft iron core caused by the load current of several amperes. The first part of the waveform (roughly the left hand two thirds) shows the pre-arcing state and the second part (the right hand third) shows the output under an arc fault condition. It is very difficult to distinguish between the normal load current and the arc fault current states, and it would require considerable effort to develop means which could use this CT output to reliably differentiate between the arc fault and non arc fault conditions. However, if the LFOP of the CT is selected to be significantly above the mains frequency, the CT could be made less responsive to the mains frequency of the normal load currents and more responsive to the high frequency components of the arc fault currents. For example, by altering the CT in FIG. 3 to have an LFOP of about 10 KHz, the non arcing and arcing responses of the CT were significantly changed, as shown in FIG. 5.

Figure 5:
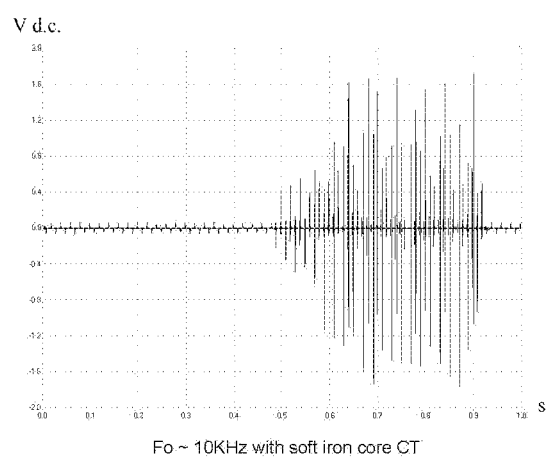

It can be seen from FIG. 5 that with an LFOP of about 10 KHz, the pre-arcing waveform and the arcing waveform produced by the CT are substantially different, making differentiation between the two states much more obvious. Therefore, by more closely matching (i.e. making more equal) the LFOP of the CT to the frequency of the targeted source current (arc current), energy transfer between primary and secondary circuits can be maximised.

In FIG. 5 the pre-arcing output from the CT can be considered to be quiescent "noise" caused by the normal load current, as produced by the vacuum cleaner in this case, and the arcing waveform can be considered to be an arc fault "indicative signal" induced by the arcing current energy. The "noise" and the indicative signal will each have an RMS value which can be measured and quantified. The ratio of the two RMS values can be considered to be a qualitative value indicating the extent to which energy is transferred from the CT primary circuit to its secondary circuit by the arcing current. For the purpose of this specification, this ratio is referred to as the energy transfer ratio, ETR. In the case of FIG. 4 the ETR was calculated to have a value of about 1, whereas in the case of FIG. 5 the ETR was about 4. A low ETR makes it difficult to distinguish between arc fault and non arc fault conditions. Conversely, a high ETR makes it easier to make such a distinction.

Figure 6:
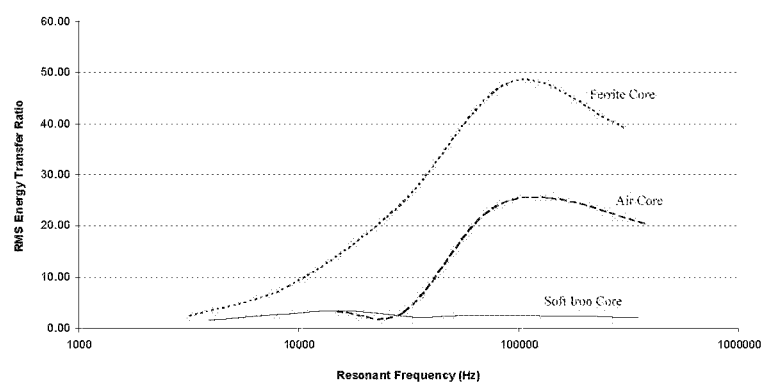
FIG. 6 shows energy transfer rates plotted against frequency for three transformer core materials.

With all other conditions of the circuit of FIG. 3 remaining unchanged, the LFOP of the CT was set to several values over the range of about 2 KHz to 1 MHz by changing the inductance value of the CT, and the ETR value was calculated at various frequency points over the range. This was repeated by replacing the soft iron core of the CT with an air core and then with a ferrite core, to determine the impact on ETR of using different CT core materials across the same frequency range. FIG. 6 shows a plot of ETR versus frequency for the three CT core materials over the above frequency range.

The ETR axis is linear whilst the frequency axis is logarithmic. It can be seen from FIG. 6 that the ETR value for the soft iron core was relatively low over the frequency range, having a maximum value of about 4 within the range 25 KHz to about 75 KHz and then decreasing thereafter. The ETR value for the air core increased rapidly from about 50 KHz and peaked at about 27 at 150 KHz with a gradual decrease thereafter to about 600 KHz. For the ferrite core the ETR value increased rapidly from the start point of 2 KHz and peaked at about 48 at 200 KHz, after which it fell off rapidly. The peak ETR value indicates the frequency point at which maximum energy was transferred from the arcing current by the CT. This frequency point was approximately 150 KHz for the air core CT and about 200 KHz for the ferrite core. The rate of decrease in ETR values was lower for frequencies just above 150 KHz than for frequencies below this value in the case of the air core CT and the ferrite core CT, indicating that optimum energy transfer was achieved at frequencies at or above about 150 KHz. Based on the data, the optimum LFOP for the air core CT and the ferrite core CT is in the range 150 KHz to about 350 KHz, after which the ETR value decreases significantly. This frequency range therefore represents the optimum operating (i.e. LFOP) range of either of these CTs for arc fault current detection.

On the basis of FIG. 6 it would appear that the ferrite CT core provided the best results in terms of ETR values. However, a CT core made from any magnetically responsive material including ferrite will be more expensive in comparison to a CT based on an air core. Furthermore, the magnetically responsive core material will cause more variances in the characteristics or performance across a range of CTs, such as permeability, the effects of temperature, RMS output, etc. which would result in additional production problems and costs in comparison to an air cored CT. The core geometry could also place constraints on design options.

Figure 7:
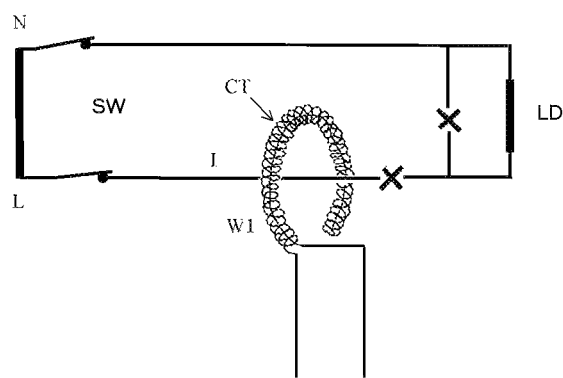
FIG. 7 is a modification of FIG. 3.

The air core may be a conventional CT wound on a core containing no magnetically responsive material, or may advantageously be produced in the form of a Rogowski coil which has a relatively low inductance compared to cores based on soft iron or ferrite and is especially suited to detecting high frequency components. The air core CT mitigates most of the problems associated with the use of a CT core comprising magnetically responsive material. FIG. 7 shows the circuit of FIG. 3 modified to use a Rogowski coil as an air core, and subsequent embodiments of the invention may be similarly modified to use Rogowski coils.

Based on the foregoing it can be seen that for a given level of arc fault current the magnitude of the energy transferred from the CT primary circuit to its secondary circuit is largely determined by the choice of the lower frequency operating point (LFOP) and the CT core material. The CT may produce an output in response to the normal load current, noise, low level arcing or arcing caused by load switching, but these will not induce sufficient energy into the CT to produce an output that exceeds predetermined time and magnitude thresholds. However, arcing currents such as those caused under arc fault conditions result in multiple flows and interruptions of relatively high level currents at very fast rates. The energy produced by these sudden bursts of current will result in energy transfer to the CT secondary circuit of sufficient magnitude and duration to facilitate detection.

Figure 8:
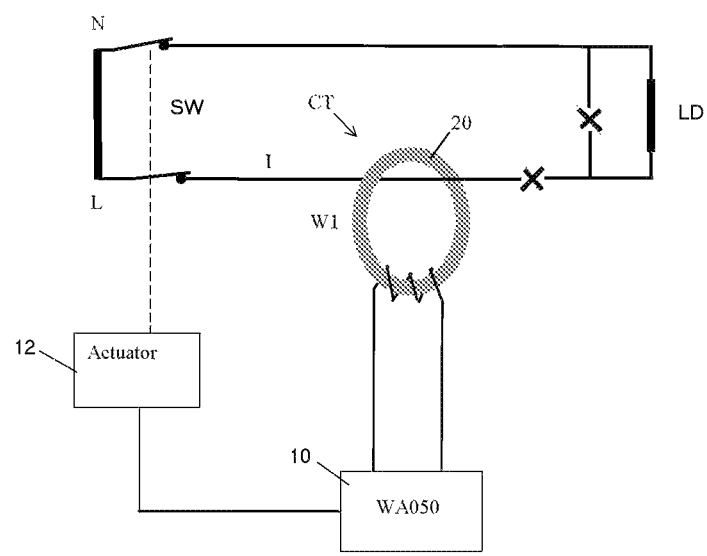
FIG. 8 is a schematic diagram of a first embodiment of the invention as used with an AC supply.

FIG. 8 shows a first embodiment of an AFD according to the invention, based upon the above principles. A single phase AC mains supply to a load LD comprises live L and neutral N conductors. A series or parallel arc fault condition, in each case indicated by an X, has occurred in the circuit. Prior to the arc fault condition, the full load current I will flow in the live conductor L. The arc fault condition will result in an arcing current flow with a broad spectrum of frequencies in the circuit. The energy from the arcing current is harnessed to facilitate detection of the arc fault.

Due to its LFOP, which is at least 10 KHz and preferably within the range 150 KHz to 350 KHz in the case of an air core or a ferrite core, the CT will have minimal response to slowly rising or sustained load currents at the mains supply frequency but will be highly responsive to current pulses with very fast rise times which would be generated by arcing.

In the arrangement of FIG. 8 the arcing current induces a voltage across W1 which is detected by the WA050 RCD integrated circuit 10. If the voltage developed across W1 is of sufficient magnitude and duration, the IC 10 will produce an output which will cause the mechanical actuator 12 to open the ganged switch contacts SW in the live and neutral conductors to disconnect the mains supply. Switches can produce normal arcing when switching loads on and off, but immunity against unwanted tripping is provided because such arcing is generally not sustained beyond the response time set on the WA050 IC 10.

Figure 8A:
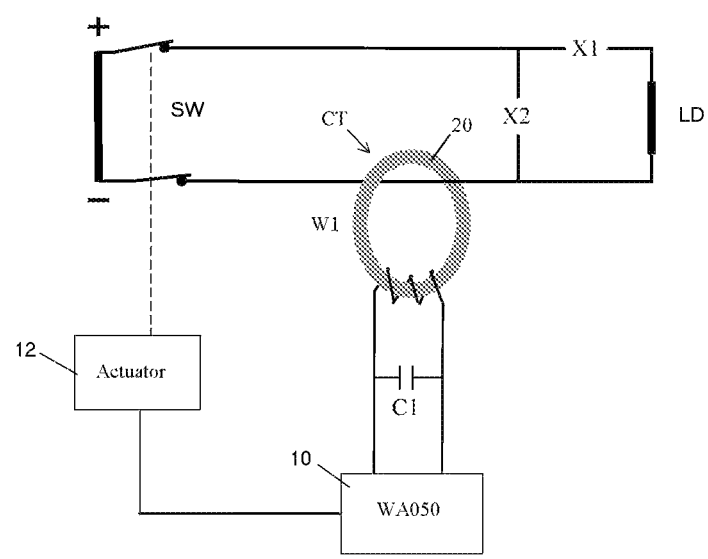
FIG. 8a is a schematic diagram of an alternative embodiment of the invention as used with a DC supply.

The embodiment of FIG. 8 shows how arc faults can be detected in a single conductor in an AC supply system. FIG. 8a shows how the invention can be applied to a DC system.

In the arrangement of FIG. 8a, the load is supplied from a DC supply which may be derived from any convenient DC source. The core 20 surrounds the DC negative conductor and in the event of a series arc fault condition as represented by X1, or a parallel arc fault condition as represented by X2, the arcing current will induce a voltage across W1 which will be detected by the WA050 RCD integrated circuit 10 as previously described.

In FIG. 8a an optional capacitor C1 is shown placed in parallel with the CT secondary winding W1 to cause oscillations between the CT and the capacitor in response to the arcing current energy. This causes an effective stretching of the output pulses produced by the CT and facilitates easier detection of the CT output. Such a capacitor may advantageously be placed across the winding W1 in any of the embodiments herein.

Figure 9:
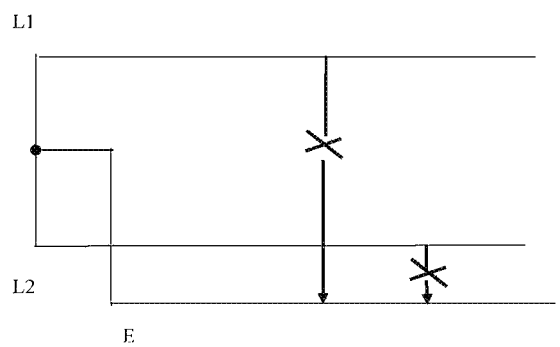
FIG. 9 is a schematic diagram showing series and parallel arcing in a two phase AC mains supply.
Figure 10:
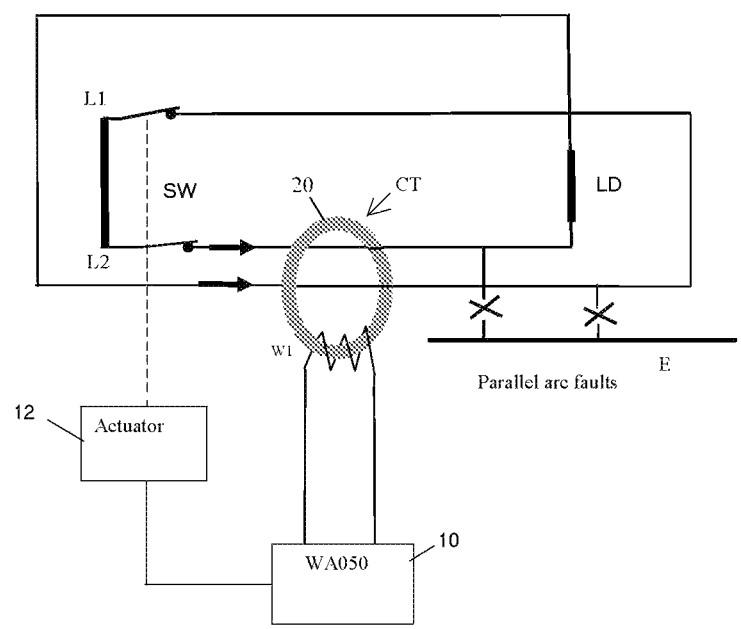
FIGS. 10 and 11 are schematic diagrams of further embodiments of the invention.

Some installations use a two phase supply as shown in FIG. 9 which is an example of an installation with two phases, L1 and L2, and a centre point earth E. Parallel arc faults are shown between each phase and earth, as an example, and it would be beneficial to detect such faults regardless of which phase they occurred on. FIG. 10 shows how arc faults on either phase can be detected by a single arc fault detecting circuit.

In the embodiment of FIG. 10 the core 20 surrounds both the L1 and L2 phase conductors whose currents pass in the same direction through the core. In effect the current flowing through the CT is twice that of the load current but the CT characteristics and the associated circuitry are chosen to ensure that the arc fault detecting circuit is not responsive under normal operating conditions. However, a series arc fault occurring along either conductor or a parallel arc fault occurring from either line to earth will be detected as previously described.

Figure 11:
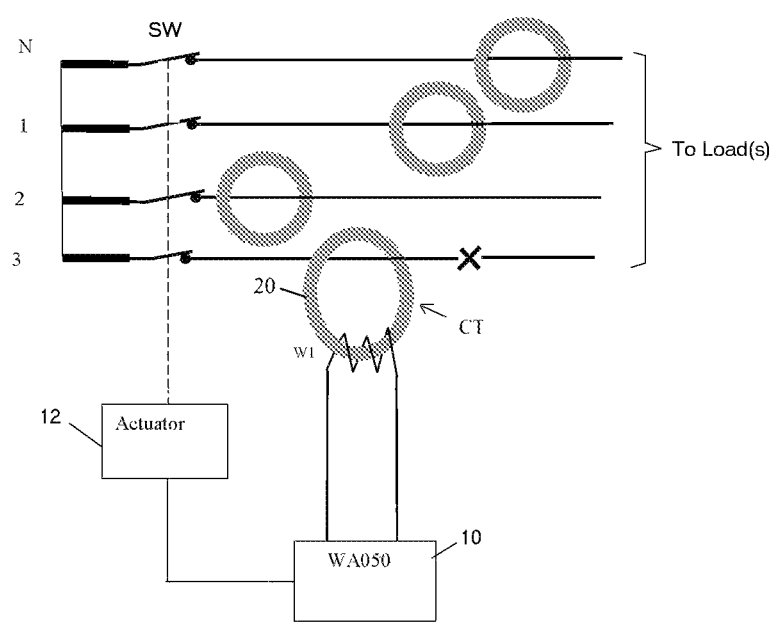

FIG. 11 shows an embodiment of the invention for arc fault detection in a three phase installation. Each conductor N, 1, 2, and 3 in the three phase installation is passed through a separate CT core each having its own arc fault detection circuitry W1, 10 (shown only for conductor 3), and if there is a series or parallel arc fault, a common actuator 12 is activated as before and all four poles will open.

Figure 12:
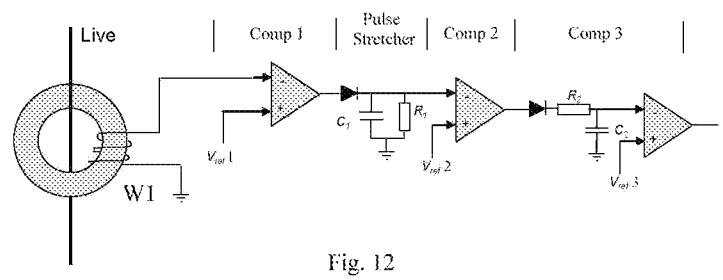
FIG. 12 is a circuit diagram of a still further embodiment of the invention.

FIG. 12 shows an alternative circuit arrangement which can be used for detection of the CT output signals in the AFDs of FIG. 8, 10, 11 or 18 (to follow), in place of the WA050 IC 10.

Figure 13:
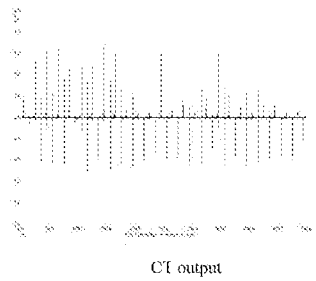
FIGS. 13 to 17 are waveform diagrams useful in explaining the operation of the embodiment of FIG. 12.
Figure 14:
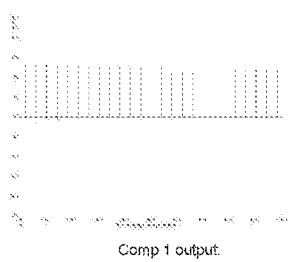
Figure 15:
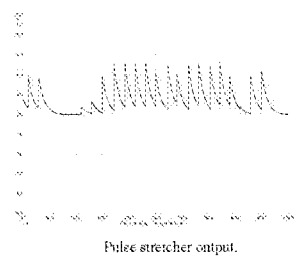
Figure 16:
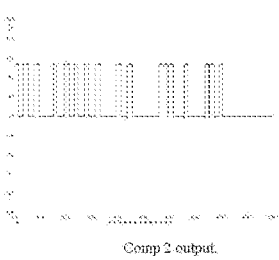
Figure 17:
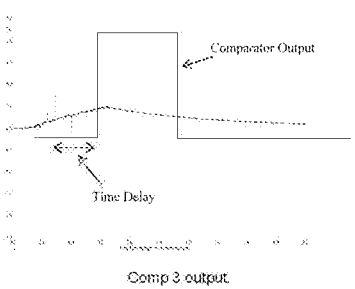

In the arrangement of FIG. 12, the output of the CT (FIG. 13) is fed to a first comparator, Comp 1. This has a reference voltage Vref1 on its negative input terminal and the CT output voltage is fed to the positive input terminal. Only voltages which exceed Vref1 level will be detected by Comp 1 and produce output voltages of approximately Vcc level. It follows that all negative going voltages are ignored by Comp 1. The voltage pulses (FIG. 14) produced by Comp 1 are fed to a pulse stretching stage comprising of diode D, capacitor C1 and resistor R. Diode D allows C1 to charge up very rapidly for each pulse produced by Comp 1. Resistor R is a bleed resistor which controls the rate of discharge of C1. Comp 2 is a second comparator with a reference voltage Vref2 on its negative terminal. The voltage developed across capacitor C1 is fed to the positive terminal of Comp 2. When the voltage on C1 exceeds Vref2 level, Comp 2 output will go high. However, because C1 acquires a charge from each pulse produced by Comp 1 very rapidly, the voltage on C1 will exceed Comp 2 reference level for a sustained period as determined by the discharge rate of C1 and R; thus Comp 2 output pulses will be wider than Comp 1 output pulses. FIG. 15 shows the stretched pulses fed to Comp 2 and FIG. 16 shows the resultant square wave output pulses from Comp 2. The square pulses from Comp 2 are used to charge a capacitor C2, and once the charge on C2 exceeds the reference voltage Vref3 of Comp 3, Comp 3 produces an output (FIG. 17). C2 acts as a voltage integrator so that Comp 3 output will only go high if the current transformer CT produces sufficient pulses of sufficient magnitude sustained over a certain period of time indicative of an arc fault current. In FIG. 17 it will be seen that the onset of the Comp 3 output is delayed until sufficient charge has built up on C2 for the voltage thereon to exceed Vref3, and persists after the arcing event until leakage on C2 once again brings the voltage thereon below Vref3. Thus the circuit of FIG. 12 provides for detection of arc fault current induced voltage pulses of a certain level in the form of a cluster sustained for a certain period of time.

If desired, the pulse detection circuit of FIG. 12 could use a diode rectifier as a first stage so as to combine rectification with threshold setting, or a full wave rectifier stage could be added so as to capture positive and negative going pulses from the CT.

Because the CT response has been optimised for operation at frequencies above about 150 KHz, lower frequency components produced by the CT will be of relatively low amplitude or magnitude and will be largely ignored, so filtering of the CT output is not required before it is fed to the electronic processing circuit, e.g. the WA050 IC of FIG. 8 or the electronic circuit of FIG. 12.

Depending on the AFD design, it may not be practical during the production process to test each AFD with an actual or a simulated arc fault current, and for this reason the correct functioning of the AFD is often verified from a small percentage of the total production on a sample basis only. This increases the risk that flawed AFDs could fail to be detected within the production process. The flawed devices may have a non functioning AFD section, have too low or too high an operating arc fault current threshold or be prone to nuisance tripping, etc.

In product standard UL1699 sub-clause 15.1, there is a requirement for arc fault detectors to be fitted with a test device which simulates an arc fault condition.

Most AFDs presently on the market claim compliance with the above requirement by combining a residual current device with the AFD and generating a residual current at mains supply frequency within the device to cause automatic tripping. These devices are generally referred to as combination AFDs. Such a test merely verifies that the RCD portion of the combination AFD is operating correctly but leaves the AFD portion largely untested. Most AFD testers used by electrical contractors for onsite testing are actually RCD/GFCI testers and cannot verify the correct functioning of the arc fault detecting portion of the AFD. Residual currents generally occur or are generated at the mains supply frequency which is typically 50 Hz or 60 Hz, but such frequencies are not representative of arc fault current frequencies. Testing of arc fault currents within UL1699 is generally carried out at the amperes level, typically greater than 2 amperes, whereas RCD/GFCI testers generally generate test currents within the milliampere region, typically less than 100 mA. Such residual currents are not representative of arc fault currents. Furthermore, whilst a parallel arc fault from line to earth will have a residual current element to it, parallel arc faults between lines and series arc faults will not have a residual current element to them, so it is not possible to verify arc fault detection under these conditions simply by the use of a relatively low level residual current to earth. There is therefore a question mark over the validity of the testing of many AFDs.

Figure 18:
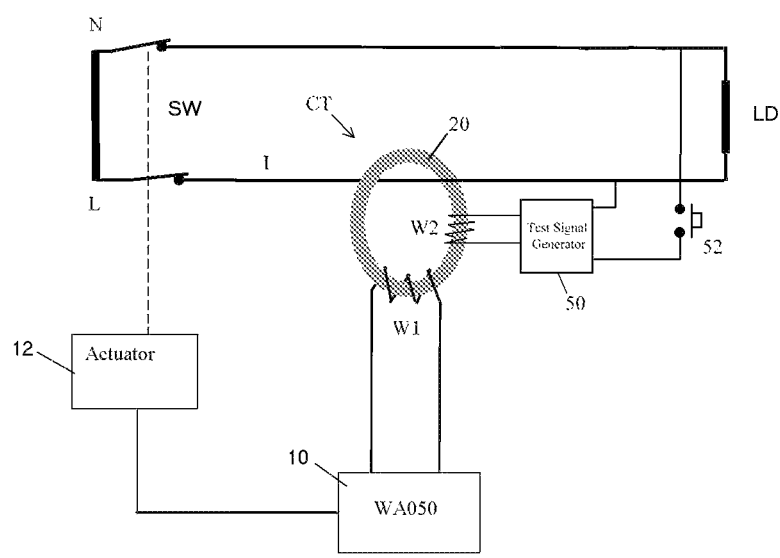
FIG. 18 shows a still further embodiment of the invention including a test circuit.

FIG. 18 shows an arc fault detector as previously described with reference to FIG. 8, but with an additional test circuit comprising a second winding W2 on the CT core 20, and a test signal generator 50 which is powered from the mains supply when a normally open test switch 52 is manually closed. When the signal generator is powered up it produces a series of pulses at a frequency representative of an arc fault condition. It can be seen from FIG. 6 that with a ferrite core the RMS energy transfer ratio increases rapidly from frequencies above about 10 KHz, and for an air core CT the RMS energy transfer ratio increases rapidly from about 40 KHz. The pulses produced by the signal generator may be a continuous series of pulses or a burst of pulses. These pulses are passed through winding W2 which acts as a CT primary winding so as to induce energy into the arc current detecting secondary winding W1. The frequency and the amplitude of the voltage pulses produced by the signal generator combined with the number of turns in W2 are selected so as to ensure that the resultant ampere turns in W2 is representative of an arc fault current rather than a mains frequency residual current. The resultant output from W1 is detected by the arc current detection circuit as before, and causes automatic opening of the contacts. In this manner the requirement of subclause 15.1 of UL1699 is met by the standalone AFD.

In addition to providing a valid means of testing the AFD on site, this test technique may be used to provide an efficient and cost effective means of carrying out testing on 100% of production and can be used in any of the embodiments herein. Furthermore, for production testing purposes, the amplitude of the pulses produced by the signal generator may be reduced to a certain level to verify non tripping at the lower level and thereby verify the minimum operating threshold of the AFD so as to mitigate the risks of nuisance tripping due to over sensitivity.

The invention can be used for detection of arc fault conditions in AC and DC circuits because its operation is dependent on energy induced into the current transformer CT and this can be derived from arcing produced on AC or DC circuits.

The RCD shown in FIG. 2 has both conductors passing through the CT such that the vector sum of the load currents as seen by the CT is zero. This is referred to as a balanced arrangement. In all of the AFD embodiments shown thus far the conductor(s) were passed through the CT so as to always result in a non-zero vector sum. This is referred to as a differential arrangement. As far as we are aware the prior art has always used differential arrangements in AFDs. Whilst it can be seen from FIGS. 8 and 10 that a single CT can be used for the detection of arc fault currents in single phase or two phase installations, the arrangement of FIG. 11 shows that several CTs are required for arc fault current detection in a multiphase installation. Although effective for this application, the use of several CTs adds considerably to complexity and cost. The differential arrangement has several drawbacks, not least of which is the complexity associated with multiphase circuits. When an AFD is combined with an RCD in a single or two phase product the two conductors are always passed through the RCD CT in a balanced arrangement and then one or both conductors have to be passed through the AFD CT in a differential arrangement. This precludes the use of a single housing containing the RCD and the AFD CTs together, which would make assembly very much simpler and save space and cost.

FIG. 19 shows an embodiment in which a single CT is used for the detection of arc fault currents in a multiphase circuit. In FIG. 19 the detection circuit is as described with reference to FIG. 12, although it could use a WA050 RCD integrated circuit as in previous embodiments.

It can be seen from FIG. 19 that the four conductors of a three phase supply all pass through the CT core in the same direction such that the vector sum of the currents flowing in the conductors is zero under normal conditions, a balanced arrangement. It was previously stated that a conventional residual current detecting circuit could not normally be used for arc fault detection. However, the arrangement of FIG. 19 exploits a phenomenon of CT core imbalance which is known to RCD manufacturers.

Referring again to FIG. 2, it can be seen that under normal supply conditions the vector sum of the currents flowing in the live and neutral conductors as seen by the CT will be zero and the CT output will therefore be zero. However, this assumption is based on the use of a perfect CT, and in practice the CT will produce a certain output current under non fault conditions, this output being due to imbalances or asymmetry in the current transformer. As the load current is increased the imbalance current will increase to a level which could exceed the threshold of the RCD and cause automatic or nuisance tripping under non fault conditions. The problems of core imbalance are described in patent specification GB2455847 and these problems can be readily encountered with RCDs having a trip level of up to 30 mA whereby the CT imbalances or fringing effects produce sufficient output from the CT under non fault conditions to cause the RCD to trip. RCD manufacturers go to considerable trouble to design their CTs to minimize core imbalance problems, including the use of shielding. Immunity to such problems is verified in RCD standards such as IEC61008 and IEC61009 by passing six times the normal load current at rated frequency through the conductors to ensure that the RCD will not trip under such conditions.

The embodiment of FIG. 19 exploits the phenomenon of core imbalance to detect arc fault currents. Asymmetry in the CT windings is intentionally introduced because it will have negligible effect under full load conditions at normal supply frequency but will have significant effects at arc fault current frequencies.

FIGS. 20a, 20b and 20c show the signal monitored at the Comp 1 output of FIG. 12 for a series arc fault current of magnitude $I_x$ for three arrangements as follows.

For FIG. 20a, a differential CT arrangement was used whereby a single conductor was passed through the CT as represented by FIG. 7.

For FIG. 20b, a balanced CT arrangement was used for a multiphase circuit as shown in FIG. 19 where all of the supply conductors of a three phase supply pass through the CT in the same direction so that the vector sum of the load currents seen by the CT is effectively zero, the CT winding being optimized to minimize core imbalance. It should be noted that the term "CT winding" as used in the description of FIGS. 19 to 21 covers both the manner in which the winding W1 is placed on the CT and the manner in which the load conductors are fed through the CT core aperture.

For FIG. 20c the CT winding was arranged to maximize core imbalance so as to exploit the effects of CT asymmetry.

It can be seen from FIG. 20a that there is a large cluster of pulses of a certain magnitude in response to the arc fault current $I_x$ which facilitates relatively easy detection, notwithstanding the fact that this output was in response to a differential CT arrangement.

It can be seen from FIG. 20b that with the balanced CT arrangement of FIG. 19 and the same arc fault current $I_x$, the magnitude and density of pulses at Comp 1 output has decreased substantially, which would make detection very difficult and unreliable. This is due to the effects of vector sum cancellation in the balanced arrangement and mitigation of CT asymmetry by optimizing the CT windings.

It can be seen from FIG. 20c that with the balanced CT arrangement of FIG. 19 and the same arc fault current $I_x$, the magnitude and density of pulses at Comp 1 output has increased substantially in comparison to FIG. 20b, sufficient to enable reliable detection of the arc fault current. The increases in magnitude and density were achieved by accentuating the asymmetry of the CT winding and thereby exploiting this asymmetry to enable arc fault current detection.

In the embodiment of FIG. 19 the CT has been designed to have a certain LFOP as previously described. Because the CT will be largely non responsive to full differential load currents at normal supply frequencies as previously described, it will also be largely non responsive to imbalance currents at normal supply frequencies in a balanced arrangement. The CT will be highly responsive to differential currents at frequencies above the LFOP, so parallel arc fault currents will be detected as previously described. However, in the case of series arc fault currents which will have a magnitude of several amperes with frequencies at or above the LFOP of the CT, the inherent asymmetry or imbalance of the CT will also produce sufficient output from the CT to permit the arc fault currents to be detected and thus make it viable to use a balanced conductor arrangement with a single CT to detect series and parallel arc fault currents in single and multiphase circuits. With a balanced CT arrangement the sensitivity of the AFD can be calibrated so that the AFD detection circuitry detects series or parallel arc fault currents when their magnitude and frequency exceeds certain thresholds as previously described. In this manner a single CT can be used for detection of arc fault currents in multiphase circuits. It also follows that a balanced arrangement can be used for detection of arc fault currents on single phase and two phase circuits.

FIG. 21 shows a balanced arrangement for detection of arc fault currents in a single phase circuit (N, L), a two phase circuit (L1, L2) or a DC supply circuit (DC+, DC−).

If desired the invention could be used with an RCD to combine the functions of arc fault protection with shock protection and ground fault protection, etc.

The invention is not limited to the embodiments described herein which may be modified or varied without departing from the scope of the invention.

The invention claimed is:

1. An arc fault detector comprising a current transformer (CT) having an air core, a primary winding and a secondary winding, the primary winding being formed by at least one conductor of an AC or DC supply circuit, the inductance of the CT being selected so that the CT has a lower frequency operating point (LFOP) of at least 10 KHz, the detector also comprising circuitry for disconnecting the supply if the voltage induced in the secondary winding meets predetermined criteria as to magnitude and duration.

2. An arc fault detector as claimed in claim 1, wherein the current transformer has an LFOP within the range 150 KHz to 350 KHz.

3. An arc fault detector as claimed in claim 1, wherein the supply circuit is a single phase AC supply comprising live and neutral conductors and the CT has a core which surrounds the live conductor only.

4. An arc fault detector as claimed in claim 1, wherein the supply circuit is a two phase AC supply and the CT has a core which surrounds both phase conductors whose currents pass in the same direction through the core such that the vector sum of the currents passing through the core is greater than zero during normal operating conditions.

5. An arc fault detector as claimed in claim 1, wherein the supply circuit is a multi phase AC supply and a respective CT core surrounds each of the supply conductors.

6. An arc fault detector as claimed in claim 1, wherein the supply circuit is a single phase AC supply comprising live and neutral conductors and the CT has a core which surrounds both conductors such that the vector sum of the currents passing through the core is greater than zero during normal operating conditions.

7. An arc fault detector as claimed in claim 1, wherein the supply circuit is a multi phase AC supply and the CT has a core which surrounds all of the supply conductors such that the vector sum of the currents passing through the core is zero during normal operating conditions.

8. An arc fault detector as claimed in claim 1, wherein the supply circuit is a DC supply and the CT has a core which surrounds one of the supply conductors.

9. An arc fault detector as claimed in claim 1, wherein the detection circuitry comprises a first comparator for providing an output pulse each time the voltage induced in the secondary winding rises above a first threshold level, a pulse stretcher for stretching the output pulses of the first comparator, a second comparator for providing an output pulse each time the voltage of a stretched output pulse rises above a second threshold level, a voltage integrator for the output pulses of the second comparator, and a third comparator for providing an output pulse when the integrated voltage rises above a third threshold level.

10. An arc fault detector as claimed in claim 1, further including a test circuit comprising a further CT primary winding and a test signal generator for generating in the further primary winding a voltage which will induce a voltage representative of an arc fault in the secondary winding.

* * * * *